United States Patent
Yao et al.

(10) Patent No.: US 10,626,251 B2
(45) Date of Patent: *Apr. 21, 2020

(54) RESIN COMPOSITION AND ARTICLES MADE THEREFROM

(71) Applicant: Elite Electronic Material (KunShan) Co., Ltd., Kunshan, Jiangsu Province (CN)

(72) Inventors: Xingxing Yao, Kunshan (CN); Rongtao Wang, Kunshan (CN); Ziqian Ma, Kunshan (CN); Yan Zhang, Kunshan (CN); Bingbing Li, Kunshan (CN); Zhenfang Shang, Kunshan (CN); Mingsheng Yuan, Kunshan (CN)

(73) Assignee: Elite Electronic Material (Kunshan) Co., Ltd., Kunshan, Jiangsu Province (CN)

( * ) Notice: Subject to any disclaimer, the term of this patent is extended or adjusted under 35 U.S.C. 154(b) by 13 days.

This patent is subject to a terminal disclaimer.

(21) Appl. No.: 15/789,417

(22) Filed: Oct. 20, 2017

(65) Prior Publication Data

US 2018/0362733 A1 Dec. 20, 2018

(30) Foreign Application Priority Data

Jun. 14, 2017 (CN) .......................... 2017 1 0445242

(51) Int. Cl.
| | |
|---|---|
| *C08K 5/5313* | (2006.01) |
| *C08K 5/5397* | (2006.01) |
| *C08J 5/24* | (2006.01) |
| *C08K 5/03* | (2006.01) |
| *C08K 5/3437* | (2006.01) |
| *C08K 5/357* | (2006.01) |
| *C08L 39/04* | (2006.01) |
| *C08K 5/00* | (2006.01) |
| *C08K 3/06* | (2006.01) |
| *C08K 3/36* | (2006.01) |

(52) U.S. Cl.
CPC .............. *C08K 5/5313* (2013.01); *C08J 5/24* (2013.01); *C08K 5/0066* (2013.01); *C08K 5/03* (2013.01); *C08K 5/3437* (2013.01); *C08K 5/357* (2013.01); *C08K 5/5397* (2013.01); *C08L 39/04* (2013.01); *C08J 2379/08* (2013.01); *C08K 3/36* (2013.01); *C08L 2201/02* (2013.01); *C08L 2203/16* (2013.01); *C08L 2203/20* (2013.01)

(58) Field of Classification Search
CPC .... C08K 5/5313; C08K 5/357; C08K 5/0066; C08K 5/5397; C08K 5/03; C08K 5/3437; C08K 3/36; C08L 39/04; C08L 2203/20; C08L 2201/02; C08L 2203/16; C08L 2201/08; C08L 2205/025; C08L 2205/035; C08L 2205/03; C08L 79/08; C08J 5/24; C08J 2379/08; B32B 2457/08; B32B 2262/101; B32B 27/36; B32B 27/281; B32B 27/12; B32B 17/10; B32B 15/18; B32B 5/02

See application file for complete search history.

(56) References Cited

U.S. PATENT DOCUMENTS

| | | | | |
|---|---|---|---|---|
| 6,620,905 B1 * | 9/2003 | Musa | .................... | C07D 265/16 525/203 |
| 2016/0222204 A1 * | 8/2016 | Wang | .................... | B32B 15/092 |

FOREIGN PATENT DOCUMENTS

| | | | | |
|---|---|---|---|---|
| CN | 104974469 A | * | 10/2015 | |
| WO | WO-2015024256 A1 | * | 2/2015 | ........... B32B 15/092 |

OTHER PUBLICATIONS

English Translation of CN104974469 (Year: 2015).*

* cited by examiner

*Primary Examiner* — Andrew J. Oyer
(74) *Attorney, Agent, or Firm* — Muncy, Geissler, Olds & Lowe, P.C.

(57) ABSTRACT

Provided is a resin composition and articles made therefrom, wherein the resin composition comprises 40 to 80 parts by weight of maleimide monomer and/or resin; 10 to 30 parts by weight of oxydianiline type benzoxazine monomer and/or resin; 10 to 40 parts by weight of flame retardant; wherein the flame retardant comprises one or more of a flame retardant having a thermal decomposition temperature of greater than 380° C., a metal phosphinate flame retardant and bis(pentabromophenyl) ethane; and wherein the metal of the metal phosphinate flame retardant is selected from Group 13 elements. By using maleimide monomer and/or resin, oxydianiline type benzoxazine monomer and/or resin and flame retardant comprising one or more of a flame retardant having a thermal decomposition temperature of greater than 380° C., a metal phosphinate flame retardant and bis(pentabromophenyl) ethane, the peel strength and the glass transition temperature of the laminate made from the resin composition are remarkably improved while the dissipation factor of the laminate is also decreased; therefore, the demand for high frequency and high thermal resistance circuit boards is satisfied.

10 Claims, No Drawings

RESIN COMPOSITION AND ARTICLES MADE THEREFROM

CROSS-REFERENCE TO RELATED APPLICATION

This application claims the priority benefits of China Patent Application No. 201710445242.5, filed on Jun. 14, 2017, the entirety of which is hereby incorporated by reference herein and made as a part of this specification.

BACKGROUND

1. Field of the Disclosure

This disclosure relates to composite materials and more particularly to resin compositions and articles made therefrom.

2. Description of Related Art

Recently, with the diversification of electronic products, the incessant innovation of electronic technology, the trend of thinner and lighter electronic products and the high-speed transmission of electronic messages, printed circuits have directed toward multi-layer construction and high density interconnection. On the other hand, the increase of layer number and trace density requires that the copper-clad laminate as the base material of the circuit board to meet higher standards, and in the hope that it may, during the designing of the printed circuits, satisfy the impedance design and tolerate the thermal shock during the process.

Currently, the mainstream copper-clad laminates on the market are mainly made from resin compositions comprising epoxy resin as the major resin and dicyandiamide or phenol novolac resin as the major curing agent, with the addition of bromine-containing or phosphorus-containing flame retardant, inorganic filler and other materials; however, their thermal resistance and dielectric properties fail to satisfy the growing needs of the electronic products market. In order to satisfy the high thermal resistance and low dielectric constant requirements of electronic materials, bis-maleimide resin-based copper-clad laminates have been developed. Bismaleimide is a thermosetting resin with high performance and has an excellent thermal resistance, moisture resistance, dielectric properties and workability, and therefore it is commonly used in the production of circuit boards. For example, a benzoxazine/bismaleimide/epoxy resin/flame retardant system is known in the art which, although to some extent, solves the problem of thermal resistance, thermal resistance after moisture absorption and flame retardancy, but the system still needs to further improve thermal resistance and overcome the problems associated with high dissipation factor and poor peel strength before satisfying the market demand.

Therefore, there is a need to provide a resin composition having excellent thermal resistance and flame retardancy, low dissipation factor and high peel strength at the same time.

SUMMARY

The technical problems to be solved by the present disclosure involve providing a resin composition having excellent thermal resistance and flame retardancy while having a low dissipation factor and high peel strength. The inventors have found that by using maleimide monomer and/or resin, oxydianiline type benzoxazine monomer and/or resin and flame retardant comprising one or more of a flame retardant having a thermal decomposition temperature of greater than 380° C., a metal phosphinate flame retardant and bis(pentabromophenyl) ethane in the resin composition, the peel strength and the glass transition temperature of a laminate made from the resin composition are remarkably improved while the dissipation factor of the laminate is also decreased.

In order to solve the above technical problems, the present disclosure provides a resin composition, comprising:
(A) 40 to 80 parts by weight of maleimide monomer and/or resin;
(B) 10 to 30 parts by weight of oxydianiline type benzoxazine monomer and/or resin; and
(C) 10 to 40 parts by weight of flame retardant;
wherein the flame retardant comprises one or more of a flame retardant having a thermal decomposition temperature of greater than 380° C., a metal phosphinate flame retardant and bis(pentabromophenyl) ethane; and wherein the metal of the metal phosphinate flame retardant is selected from Group 13 (a.k.a. Group IIIA) elements.

Moreover, the resin composition further comprises 1 to 8 parts by weight of cyanate ester monomer and/or resin.

Furthermore, the oxydianiline type benzoxazine monomer and/or resin comprises one or more of a monomer represented by Formula (I), an oligomer obtained from the aforesaid monomer, a polymer obtained from the aforesaid monomer, a derivative of the monomer represented by Formula (I), an oligomer of the aforesaid derivative and a polymer of the aforesaid derivative:

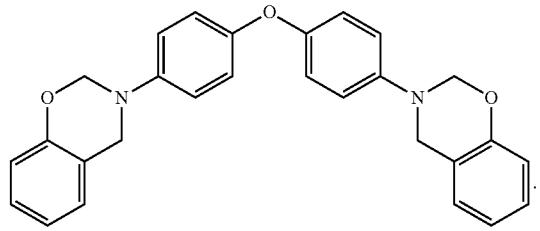

Formula (I)

Furthermore, the flame retardant having a thermal decomposition temperature of greater than 380° C. has two DPPO structures.

Furthermore, the flame retardant having a thermal decomposition temperature of greater than 380° C. has a structure represented by Formula (II) or Formula (III):

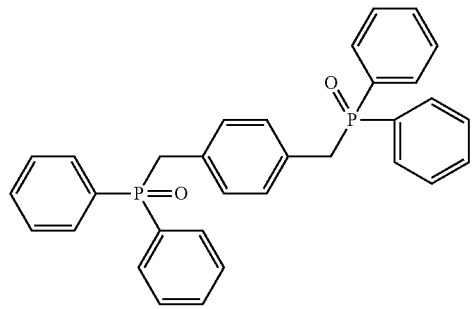

Formula (II)

-continued

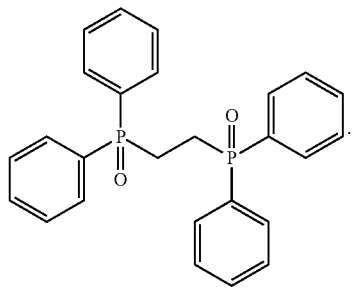

Formula (III)

Furthermore, the flame retardant having a thermal decomposition temperature of greater than 380° C. has preferably a structure represented by Formula (II).

Furthermore, the metal phosphinate flame retardant is an aluminum phosphinate.

Furthermore, the metal phosphinate flame retardant is represented by Formula (IV):

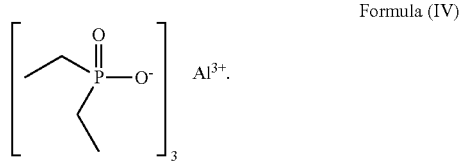

Formula (IV)

Furthermore, the resin composition further comprises epoxy resin.

Furthermore, the present disclosure further provides an article made from any of the aforesaid resin compositions, and the article comprises a prepreg, a resin film, a copper-clad laminate or a printed circuit board.

As described above, the laminate made from the resin composition provided by the present disclosure has a high thermal resistance, peel strength and glass transition temperature and is characterized by having a low dissipation factor, therefore satisfying the requirements of high frequency and high thermal resistance of circuit boards.

DESCRIPTION OF THE EMBODIMENTS

Preferred embodiments of the present disclosure will now be described in detail; however, these embodiments are illustrative in nature only and are not exhaustive. On the contrary, the purpose of the disclosure in conjunction with these embodiments is to cover other alternatives or modifications that may be extended according to the scope of the claims. In order to provide a thorough understanding of the present disclosure, the following description will include many specific details which may not be used in the present disclosure. In addition, some specific details will be omitted in the description in order to avoid confusion of the major features of the present disclosure.

The present disclosure provides a resin composition, comprising:
(A) 40 to 80 parts by weight of maleimide monomer and/or resin;
(B) 10 to 30 parts by weight of oxydianiline type benzoxazine monomer and/or resin; and
(C) 10 to 40 parts by weight of flame retardant;
the flame retardant comprises one or more of a flame retardant having a thermal decomposition temperature (Td) of greater than 380° C., a metal phosphinate flame retardant and bis(pentabromophenyl) ethane, wherein the metal of the metal phosphinate flame retardant is selected from Group 13 elements, and
wherein the Td refers to the thermal decomposition temperature at 5% weight loss, as measured by reference to IPC-TM-6502.4.24.6.

In the present disclosure, maleimide monomer and/or resin may be one or more of a monomer, oligomer and polymer of maleimide or derivatives thereof, and maleimide may be bismaleimide or multifunctional maleimide; for example, the maleimide may comprise but is not limited to at least one selected from the group consisting of 4,4'-diphenylmethane bismaleimide, phenylmethane maleimide and oligomer thereof, m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, and 1,6-bismaleimide-(2,2,4-trimethyl)hexane. Examples include, but not limited to, maleimide available from Daiwakasei Industry Co., Ltd., HOS technik Corporation, K.I Chemical Industry Co., Ltd. or Designer Molecules Inc. Furthermore, in the resin composition of the present disclosure, the amount of maleimide monomer and/or resin is 40 to 80 parts by weight; when the amount of maleimide monomer and/or resin in the resin composition is less than 40 parts by weight, the modulus decrease rate of the laminate is increased and the thermal resistance is decreased; when the amount is greater than 80 parts by weight, the thermal resistance of the laminate is decreased and fails to meet the requirements.

Furthermore, the oxydianiline type benzoxazine monomer and/or resin in the present disclosure may be one or more of a monomer, oligomer and polymer of oxydianiline type benzoxazine or derivatives thereof. Compared with other types of benzoxazine, copper-clad laminates made from the resin composition using oxydianiline type benzoxazine monomer and/or resin have a significantly high peel strength. In the resin composition of the present disclosure, the amount of oxydianiline type benzoxazine monomer and/or resin is 10 to 30 parts by weight, and when the amount of oxydianiline type benzoxazine monomer and/or resin in the resin composition is less than 10 parts by weight, the peel strength of the laminate is remarkably decreased; when the amount is greater than 30 parts by weight, the thermal resistance of the laminate is decreased and fails to meet the need of the laminate.

Still further, the oxydianiline type benzoxazine monomer and/or resin comprises one or more of a monomer represented by Formula (I), an oligomer obtained from the aforesaid monomer, a polymer obtained from the aforesaid monomer, a derivative of the monomer represented by Formula (I), an oligomer of the aforesaid derivative and a polymer of the aforesaid derivative:

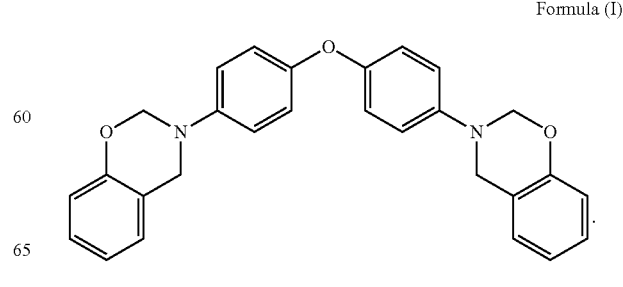

Formula (I)

Furthermore, the flame retardant having a Td of greater than 380° C. is preferably a flame retardant having a Td of greater than 380° C. and having two DPPO structures; compared with other low Td flame retardants, the glass transition temperature of the laminate made from the flame retardant of the present disclosure is remarkably increased, and the dissipation factor is remarkably decreased.

Furthermore, the flame retardant having a Td of greater than 380° C. has preferably a structure represented by Formula (II) or Formula (III):

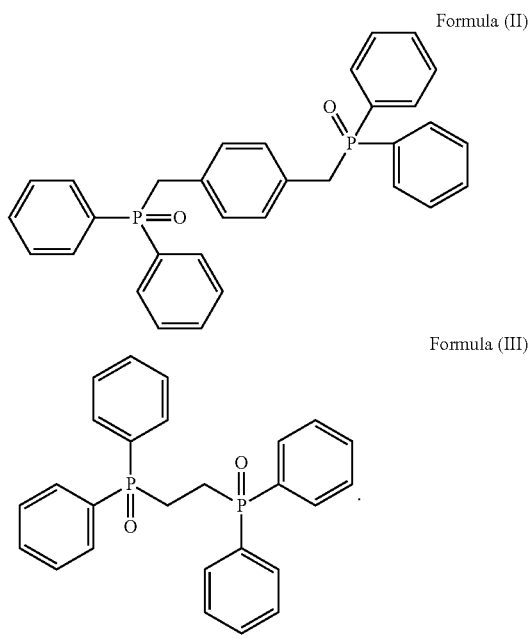

Formula (II)

Formula (III)

Furthermore, the flame retardant having a thermal decomposition temperature of greater than 380° C. has preferably a structure represented by Formula (II).

Furthermore, the metal phosphinate comprises an organic or inorganic metal phosphinate, wherein the two hydrogen atoms on the phosphorus atom in the metal phosphinate may be substituted with any substituent; the metal phosphinate is preferably an aluminum phosphinate; still further, the metal phosphinate is preferably represented by Formula (IV):

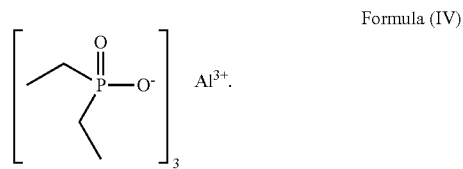

Formula (IV)

Furthermore, in the present disclosure, the amount of the flame retardant is 10 to 40 parts by weight. When the amount of flame retardant in the resin composition is less than 10 parts by weight, the glass transition temperature and flame retardancy of the laminate made from the resin composition are both decreased. When the amount is greater than 40 parts by weight, the peel strength of the copper-clad laminate is decreased, and the modulus decrease rate is remarkably increased.

In addition, the resin composition may further comprise 1 to 8 parts by weight of cyanate ester monomer and/or resin.

The cyanate ester monomer and/or resin may be one or more of a monomer, oligomer and polymer of cyanate ester or derivatives thereof. In the above resin composition, the cyanate ester monomer is a compound having an O—C≡N structure or an Ar—O—C≡N structure, wherein Ar may be bound to a substituted or unsubstituted dicyclopentadienyl (DCPD) group. Cyanate ester monomer and/or resin comprises but is not limited to 2,2-bis(4-cyanatophenyl)propane, bis(4-cyanatophenyl)ethane, bis(3,5-dimethyl-4-cyanatophenyl)methane, 2,2-bis(4-cyanatophenyl)-1,1,1,3,3,3-hexafluoropropane, and cyanate ester resins prepared from dicyclopentadiene-phenol copolymers, etc., such as BA-230S, BA-3000S, BTP-6020S and other cyanate ester resins available from Lonza. By adding cyanate ester monomer and/or resin in the resin composition, the peel strength of the copper with a carrier of the laminate can be remarkably increased, but when the amount of cyanate ester monomer and/or resin is greater than 8 parts by weight, the modulus decrease rate of the laminate is increased, and the peel strength of the copper with a carrier will be remarkably decreased.

Other Suitable Components

In the present disclosure, the resin composition may comprise an epoxy resin, which may be selected from a bifunctional epoxy resin, a trifunctional epoxy resin, a tetrafunctional epoxy resin and a multifunctional epoxy resin. Preferably, the epoxy resin is selected from bisphenol A epoxy resin, bisphenol F epoxy resin, bisphenol S epoxy resin, bisphenol E epoxy resin, phenol novolac epoxy resin, bisphenol A novolac epoxy resin, o-cresol novolac epoxy resin, dicyclopentadiene (DCPD) epoxy resin, phosphorus-containing epoxy resin, fluorine-containing epoxy resin, p-xylene epoxy resin, naphthalene epoxy resin, benzopyran epoxy resin, biphenyl novolac epoxy resin, phenol aralkyl novolac epoxy resin, phenol benzaldehyde epoxy resin, 2,6-dimethyl phenol novolac epoxy resin, tribenzyl epoxy resin and a combination thereof.

In one embodiment, the phosphorus-containing epoxy resin may be a DOPO-containing epoxy resin or a DOPO-HQ-containing epoxy resin; the aforesaid DOPO-containing epoxy resin is selected from DOPO-containing phenol novolac epoxy resin, DOPO-containing o-cresol novolac epoxy resin, DOPO-containing bisphenol A novolac epoxy resin and a combination thereof the aforesaid DOPO-HQ-containing epoxy resin is selected from DOPO-HQ-containing phenol novolac epoxy resin, DOPO-HQ-containing o-cresol novolac epoxy resin, DOPO-HQ-containing bisphenol A novolac epoxy resin and a combination thereof.

A second flame retardant can be included in the resin composition in addition to the component (C) for use in conjunction therewith, wherein the second flame retardant comprises, but not limited to, a compound with flame retardant element(s) or flame retardant functional group(s), such as a phosphorous-containing compound, a nitrogen-containing compound or a bromine-containing compound. The phosphorous-containing compound may be at least one of the following compounds, but not limited thereto: bisphenol diphenyl phosphate, ammonium polyphosphate, hydroquinone bis-(diphenyl phosphate), bisphenol A bis-(diphenyl phosphate), tri(2-carboxyethyl) phosphine (TCEP), tri (chloroisopropyl)phosphate, trimethyl phosphate (TMP), dimethyl methyl phosphonate (DMMP), resorcinol bis(dixylenyl phosphate) (RDXP, such as PX-200, commercially available from Daihachi Chemical Industry Co., Ltd.), 4,4'-biphenyl bis(phosphodiesterase-(2,6-dimethylphenyl)ester) (such as PX-202, commercially available from Daihachi Chemical Industry Co., Ltd.), phosphazene (such as SPB- 100, commercially available from Otsuka Chemical Co., Ltd.), m-phenylene methylphosphonate (PMP), melamine polyphosphate, 9,10-dihydro-9-oxa-10-phosphaphenanthrene-10-oxide (DOPO), DOPO-containing phenolic resin, (e.g., DOPO-HQ, DOPO-containing phenolic novolac (DOPO-PN) resin), DOPO-containing bisphenol novolac (DOPO-BPN) resin, DOPO-containing epoxy resin, DOPO-HQ-containing epoxy resin, etc., wherein the DOPO-containing bisphenol novolac (DOPO-BPN) resin may be DOPO-containing bisphenol A novolac (DOPO-BPAN) resin, DOPO-containing bisphenol F novolac (DOPO-BPFN) resin, and DOPO-containing bisphenol S novolac (DOPO-BPSN) resin and other bisphenol novolac compounds, and diphenyl phosphine oxide (DPPO) compounds, and the derivatives of diphenyl phosphine oxide, etc. The nitrogen-containing compound may be selected from amino triazine novolac (ATN), melamine cyanurate, trihydroxy ethyl isocyanurate or a combination thereof. The bromine-containing compound may be selected from, but not limited to, at least one of tetrabromobisphenol A (TBBPA), tetrabromocyclohexane, hexabromocyclodecane or 2,4,6-tris(tribromophenoxy)-1,3,5-triazine.

Preferably, the second flame retardant is used in an amount of 0 to 600% of component (C) in the resin composition.

The resin composition may further comprise at least one of the following additives: a curing accelerator, a solvent, a crosslinking agent, a coupling agent, a surfactant, a toughening agent and an inorganic filler.

The resin composition may be further added with inorganic filler. The purpose of adding inorganic filler is to increase the thermal conductivity of the resin composition and to improve its thermal expansion, mechanical strength and other properties, and the inorganic filler is preferably evenly distributed in the resin composition.

The inorganic filler may comprise at least one of silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, diamond-like carbon powder, graphite, magnesium carbonate, potassium titanate, ceramic fiber, mica, boehmite, zinc molybdate, ammonium molybdate, zinc borate, calcium phosphate, calcinated talc, talc, silicon nitride, mullite, calcinated kaolin, clay, basic magnesium sulfate whisker, mullite whisker, barium sulfate, magnesium hydroxide whisker, magnesium oxide whisker, calcium oxide whisker, carbon nanotube, nano-scale silica and associated inorganic powder, and powder particles having an organic core and a shell modified by an insulator. Moreover, the inorganic filler can be spherical, fibrous, plate-like, particulate, sheet-like or whisker-like in shape and can be optionally pretreated by a silane coupling agent.

10 to 200 parts by weight of inorganic filler is preferably added, which is preferably spherical nano-scale silica or poly(tetrafluoroethene) powder (PTFE powder).

The purpose of adding curing accelerator is to increase the reaction rate of the resin composition. The purpose of adding surfactant is to ensure uniform distribution of the inorganic filler in the resin composition and to avoid aggregation of the inorganic filler. The purpose of adding toughener is to improve the toughness of the resin composition. The purpose of adding solvent is to change the solid content of the resin composition and to adjust the viscosity of the resin composition. Additives with one or more of the aforesaid effects used in this field can be used by the present disclosure.

Preferably, the use amounts of the curing accelerator, coupling agent, toughener and solvent are 0.01 to 5 parts by weight, 0.001 to 0.1 parts by weight, 5 to 50 parts by weight, and 50 to 300 parts by weight, respectively.

The resin composition can be optionally added with one or more curing accelerators to increase the curing rate. Any curing accelerator capable of increasing the curing rate of the resin composition of this disclosure is useful.

The resin composition may comprise a catalyst, such as a Lewis base or a Lewis acid. The Lewis base may include at least one of imidazole, boron trifluoride amine complex, ethyltriphenyl phosphonium chloride, 2-methylimidazole, 2-phenylimidazole, 2-ethyl-4-methylimidazole, triphenylphosphine and 4-dimethylaminopyridine. The Lewis acid may comprise at least one of a metal salt compound, such as a manganese, iron, cobalt, nickel, copper, or zinc metal salt compound, preferably a metal catalyst such as zinc octanoate or cobalt octanoate.

The coupling agent may be silane and/or siloxane compound.

Preferably, the coupling agent is at least one of an amino silane compound, an amino siloxane compound, a styrene silane compound, a styrene siloxane compound, an acrylic silane compound, an acrylic siloxane compound, a methacrylic silane compound, a methacrylic siloxane compound, an alkyl silane compound and an alkyl siloxane compound.

The toughener may be at least one of the rubber resin, carboxyl-terminated polybutadiene acrylonitrile, and core-shell polymer.

The solvent may comprise at least one selected from the group consisting of methanol, ethanol, ethylene glycol methyl ether, acetone, methyl ethyl ketone, methyl isobutyl ketone, cyclohexanone, toluene, xylene, methoxyethyl acetate, ethoxyethyl acetate, propoxyethyl acetate, ethyl acetate, dimethylformamide, propylene glycol methyl ether, gamma-butyrolactone (GBL) and diisobutyl ketone (DIBK).

Article Made from the Resin Composition

This disclosure also provides a prepreg prepared from the aforesaid resin composition.

In one embodiment, the prepreg may comprise a reinforcement material and the afore-mentioned resin composition, wherein the reinforcement material is impregnated with the resin composition and becomes semi-cured (B-staged) under high temperature heating. The reinforcement material may be fibrous material, woven fabric and non-woven fabric, such as fiberglass fabric (E-glass, L-glass, NE-glass, Si-glass) or liquid crystal non-woven fabric (available from Kuraray), which can increase the mechanical strength of the prepreg. In addition, the reinforcement material can be optionally pre-treated by silane coupling agent.

This disclosure further provides a resin film made from the resin composition.

In one embodiment, the resin film comprises the aforesaid resin composition and a substrate. The substrate comprises polyester film (PET film), polyimide film (PI film) or copper foil. The resin film may be coated on a PET film, PI film or copper foil, followed by heating and baking to the B-stage to form a resin coated copper (RCC).

This disclosure further provides a laminate made from the resin composition.

In one embodiment, the laminate, such as a copper-clad laminate, comprises two or more metal foils and at least one insulation layer. The metal foil may be for example a copper foil and may further contain at least one metal alloy such as aluminum, nickel, platinum, silver, gold, etc.; the insulation layer is made by curing the aforesaid prepreg or resin film at high temperature and high pressure, such as by placing the aforesaid prepreg between two metal foils and performing lamination at high temperature and high pressure.

This disclosure also provides a printed circuit board which comprises the aforesaid laminate.

In one embodiment, the printed circuit board comprises at least one aforesaid laminate. The printed circuit board may be made according to conventional processes.

Chemical reagents used in the examples, comparative examples and synthesis examples are listed below:
1. Phenylmethane maleimide: BMI-2300, available from Daiwakasei Industry Co., Ltd.
2. Bismaleimide: BMI-70, available from K.I Chemical Industry Co., Ltd.
3. Diamino diphenyl ether benzoxazine resin: PF-3500, available from Chang Chun Plastics. Co., Ltd.
4. Allyl-terminated benzoxazine: 5031, available from KOLON Industries Inc.
5. Bisphenol A type benzoxazine resin: LZ 8290, available from Huntsman Corporation.
6. Bisphenol F type benzoxazine resin: LZ 8280, available from Huntsman Corporation.
7. Dicyclopentadiene phenol epoxy resin: HP-7200HH, available from D.I.C.
8. 2,6-Dimethyl phenol novolac epoxy resin: NPPN-260A80, available from Nan Ya Plastics Corporation.
9. Phenol benzaldehyde epoxy resin: NPPN-433, available from Nan Ya Plastics Corporation.
10. Cyanate ester: BA-230S, available from Lonza.
11. Di-DPPO phosphorus-containing flame retardant with high Td: diphenylphosphine oxide, disclosed in the China Patent Publication Number CN105440645(A).
12. Aluminum phosphinate: OP-935, available from Clariant International Ltd.
13. Bis(pentabromophenyl) ethane: SAYTEX 8010, available from Albemarle Corporation.
14. Condensed phosphate ester (phosphorus-containing flame retardant with low Td): PX-200, available from Daihachi Chemical Industry Co., Ltd.
15. Phosphazene (phosphorus-containing flame retardant with low Td): SPB-100, available from Otsuka Chemical Co., Ltd.
16. Phosphorus-containing flame retardant (phosphorus-containing flame retardant with low Td): SPV-100, available from Otsuka Chemical Co., Ltd.
17. Silica: D70, available from Chongqing Jinyi Silicon Materials Development Co., Ltd.
18. 2-Ethyl-4-methylimidazole: 2E4MI, available from Shikoku Chemicals Corporation.

SYNTHESIS EXAMPLES

Synthesis Example 1: Amine-Modified Bismaleimide Prepolymer (BMI-A)

5 g of 4,4'-diaminodiphenyl sulfone, 65 g of DMAc and 0.13 g of triphenylphosphine catalyst were added to a three-necked flask and stirred to clear; and then 60 g of diphenylmethane bismaleimide was added; after stirring evenly, the solution was heated to 90 to 100° C. and reacted at this temperature for 8 hours, and then rapidly removed and cooled to room temperature to give a reddish brown transparent liquid as amine-modified BMI-A.

Examples 1-19 (E1-E19) and Comparative Examples 1-17 (C1-C17)

1. Prepregs were Made from the Resin Compositions Listed in Tables 1 and 2.

Each resin composition of E1-E19 and C1-C17 shown in Tables 1 and 2 was well mixed in a stirred tank respectively and then placed in an impregnation tank respectively, and glass fiber fabric (2116 or 7628 E-glass fiber fabric, available from Asahi Corp.) was individually passed through the impregnation tank to impregnate the glass fiber fabric with the resin composition, followed by heating and baking at 150° C. to a semi-cured state to obtain a prepreg.

2. Copper-Clad Laminates and Copper-Free Laminates were Made as Follows:

(1) Copper-Clad Laminates and Copper-Free Laminates (Five-Ply)

Two high-temperature elongation (HTE) copper foils with a thickness of 18 μm (half-ounce) and five prepregs (2116 E-glass fiber fabric) obtained from respective Examples and Comparative Examples were prepared, wherein the resin content of each prepreg is about 55%. The copper foil, the five prepregs and the copper foil were sequentially superimposed and subject to a lamination process under vacuum at 195° C. for 2 hours to form a copper-clad laminate (five-ply), in which the five superimposed prepregs were cured to form an insulation layer between the two copper foils. The resin content of the insulation layer is about 55%.

Each of the above copper-clad laminates was etched to remove the two copper foils so as to obtain a copper-free laminate (five-ply), which was obtained from five prepregs laminated together and had a resin content of about 55%.

(2) Copper-Free Laminates (Two-Ply)

Two HTE copper foils with a thickness of 18 μm (half-ounce) and two prepregs (2116 E-glass fiber fabric) obtained from respective Examples and Comparative Examples were prepared. The copper foil, the two prepregs and the copper foil were sequentially superimposed and subject to a lamination process under vacuum at 195° C. for 2 hours to form a copper-clad laminate (two-ply).

Next, each copper-clad laminate was etched to remove the two copper foils to obtain a copper-free laminate (two-ply), which was obtained from two prepregs laminated together and had a resin content of about 55%.

(3) Copper-Free Laminates (Eight-Ply)

Two HTE copper foils with a thickness of 18 μm (half-ounce) and eight prepregs (2116 E-glass fiber fabric) obtained from respective specimens were prepared. The resin content of each prepreg is about 48%. The copper foil, the eight prepregs and the copper foil were sequentially superimposed and subject to a lamination process under vacuum at 195° C. for 2 hours to form a copper-clad laminate. Next, each copper-clad laminate was etched to remove the two copper foils to obtain a copper-free laminate (eight-ply), which was obtained from eight prepregs laminated together, and its insulation layers had a thickness of 0.82 mm.

TABLE 1

Constitution of the resin compositions of E1-E19 (unit: parts by weight)

| | Components | | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| Maleimide resin | Phenylmethane maleimide | BMI-2300 | 50 | 40 | 80 | 35 | | 35 | 35 | 35 | 35 | 35 | 35 | 35 | 35 | 35 | 35 | 35 | 35 | 35 | 35 |
| | 2,6-Dimethyl-2,6-diethyl bismaleimide | BMI-70 | | | | 15 | | 15 | 15 | 15 | 15 | 15 | 15 | 15 | 15 | 15 | 15 | 15 | 15 | 15 | 15 |
| | Amine-modified bismaleimide prepolymer | BMI-A | | | | | 50 | | | | | | | | | | | | | | |
| Benzoxazine resin | Oxydianiline type benzoxazine resin (ODA-Bz) | PF-3500 | 25 | 25 | 25 | 25 | 25 | | 30 | 25 | 25 | 25 | 25 | 25 | 25 | 25 | 25 | 25 | 25 | 25 | 25 |
| | Bisphenol A type benzoxazine resin (BPA-Bz) | LZ 8290 | | | | | | 10 | | | | | | | | | | | | | |
| | Bisphenol F type benzoxazine resin | LZ 8280 | | | | | | | | | | | | | | | | | | | |
| | Allyl-terminated benzoxazine resin | 5031 | | | | | | | | | | | | | | | | | | | |
| Epoxy resin | 2,6-Dimethyl phenol novolac epoxy resin | NPPN-260 A80 | 20 | 20 | 20 | 20 | 20 | 20 | 20 | | | 10 | 0 | | | | | | | | |
| | Phenol benzaldehyde resin | NPPN-433 | | | | | | | | | | 5 | | 40 | | | | | | | |
| | Dicyclopentadiene epoxy resin | HP-7200 HH | | | | | | | | 20 | 5 | | | | | | | | | | |
| Cyanate ester | Cyanate ester | BA-230S | | | | | | | | 20 | | | | | | | | | | | |
| Flame retardant | Di-DPPO phosphorus-containing flame retardant with high Td | Di-DPPO | 20 | 20 | 20 | 20 | 20 | 20 | 20 | 20 | 20 | 20 | 20 | 3 20 | 1 20 | 8 20 | 20 | 20 | 10 | 40 | |
| | Phosphorus-containing flame retardant (aluminum phosphinate) | OP-935 | | | | | | | | | | | | | | | | | 10 | | |
| | Bis(pentabromophenyl) ethane | SAYTEX 8010 | | | | | | | | | | | | | | | | | | | 20 |
| Flame retardant with low Td | Phosphorus-containing flame retardant | PX-200 | | | | | | | | | | | | | | | | | | | |
| | Phosphorus-containing flame retardant | SPV-100 | | | | | | | | | | | | | | | | | | | |
| | Phosphorus-containing flame retardant | SPB-100 | | | | | | | | | | | | | | | | | | | |
| Inorganic filler | Silica | D70 | 100 | 100 | 100 | 100 | 100 | 100 | 100 | 100 | 100 | 100 | 100 | 100 | 100 | 100 | 100 | 100 | 100 | 100 | 100 |
| Catalyst | 2-Ethyl-4-methylimidazole | 2E4MI | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Solvent | Methyl ethyl ketone | MEK | aa | aa | aa | aa | aa | aa | aa | aa | aa | aa | aa | aa | aa | aa | aa | aa | aa | aa | aa |
| | Dimethylacetamide | DMAc | aa | aa | aa | aa | aa | aa | aa | aa | aa | aa | aa | aa | aa | aa | aa | aa | aa | aa | aa |

(aa represents "appropriate amount")

TABLE 2

Constitution of the resin compositions of C1-C17 (unit: parts by weight)

| | Components | | Comparative Examples 1 | 2 | 3 | 4 | 5 | 6 | 7 | 8 | 9 |
|---|---|---|---|---|---|---|---|---|---|---|---|
| Maleimide resin | Phenylmethane maleimide | BMI-2300 | 30 | 170 | 35 | 35 | 35 | 35 | 35 | 35 | 35 |
| | 2,6-Dimethyl-2,6-diethyl bismaleimide | BMI-70 | | | 15 | 15 | 15 | 15 | 15 | 15 | 15 |
| | Amine-modified bismaleimide prepolymer | BMI-A | | | | | | | | | |
| Benzoxazine resin | Oxydianiline type benzoxazine resin (ODA-Bz) | PF-3500 | 25 | 25 | 5 | 40 | | | | | 0 |
| | Bisphenol A type benzoxazine resin (BPA-Bz) | LZ 8290 | | | | | 25 | | | 5 | |
| | Bisphenol F type benzoxazine resin | LZ 8280 | | | | | | 25 | | 5 | |
| | Allyl-terminated benzoxazine resin | 5031 | | | | | | | 25 | 15 | |
| Epoxy resin | 2,6-Dimethyl phenol novolac epoxy resin | NPPN-260 A80 | 20 | 20 | 20 | 20 | 20 | 20 | 20 | 20 | 20 |
| | Phenol benzaldehyde epoxy resin | NPPN-433 | | | | | | | | | |
| | Dicyclopentadiene epoxy resin | HP-7200 HH | | | | | | | | | |
| Cyanate ester | Cyanate ester | BA-230S | | | | | | | | | |
| Flame retardant | Di-DPPO phosphorus-containing flame retardant with high Td | Di-DPPO | 20 | 20 | 20 | 20 | 20 | 20 | 20 | 20 | 20 |
| Flame retardant with low Td | Phosphorus-containing flame retardant | PX-200 | | | | | | | | | |
| | Phosphorus containing flame retardant | SPV-100 | | | | | | | | | |
| | Phosphorus containing flame retardant | SPB-100 | | | | | | | | | |
| Inorganic filler | Silica | D70 | 100 | 100 | 100 | 100 | 100 | 100 | 100 | 100 | 100 |
| Catalyst | 2-Ethyl-4-methylimidazole | 2E4MI | 0.4 | 0.4 | 0.4 | 0.4 | 0.4 | 0.4 | 0.4 | 0.4 | 0.4 |
| Solvent | Methyl ethyl ketone | MEK | aa | aa | aa | aa | aa | aa | aa | aa | aa |
| | Dimethylacetamide | DMAc | aa | aa | aa | aa | aa | aa | aa | aa | aa |

| | Components | | Comparative Examples 10 | 11 | 12 | 13 | 14 | 15 | 16 | 17 |
|---|---|---|---|---|---|---|---|---|---|---|
| Maleimide resin | Phenylmethane maleimide | BMI-2300 | 0 | 35 | 35 | 35 | 35 | 35 | 35 | 35 |
| | 2,6-Dimethyl-2,6-diethyl bismaleimide | BMI-70 | 0 | 15 | 15 | 15 | 15 | 15 | 15 | 15 |
| | Amine-modified bismaleimide prepolymer | BMI-A | | | | | | | | |
| Benzoxazine resin | Oxydianiline type benzoxazine resin (ODA-Bz) | PF-3500 | 25 | 25 | 25 | 25 | 25 | 25 | 25 | 25 |
| | Bisphenol A type benzoxazine resin (BPA-Bz) | LZ 8290 | | | | | | | | |
| | Bisphenol F type benzoxazine resin | LZ 8280 | | | | | | | | |
| | Allyl-terminated benzoxazine resin | 5031 | | | | | | | | |
| Epoxy resin | 2,6-Dimethyl phenol novolac epoxy resin | NPPN-260 A80 | 20 | 20 | 20 | 20 | 20 | 20 | 20 | 20 |
| | Phenol benzaldehyde epoxy resin | NPPN-433 | | | | | | | | |

TABLE 2-continued

Constitution of the resin compositions of C1-C17 (unit: parts by weight)

| | | | | | | | | | | |
|---|---|---|---|---|---|---|---|---|---|---|
| | Dicyclopentadiene epoxy resin | HP-7200 HH | | | | | | | | |
| Cyanate ester | Cyanate ester | BA-230S | | 11 | | | | | | |
| Flame retardant | Di-DPPO phosphorus-containing flame retardant with high Td | Di-DPPO | 20 | 20 | | | | | 0 | 55 |
| Flame retardant with low Td | Phosphorus-containing flame retardant | PX-200 | | | | 20 | | 10 | | |
| | Phosphorus containing flame retardant | SPV-100 | | | | | 20 | 5 | | |
| | Phosphorus containing flame retardant | SPB-100 | | | | | | 20 | 5 | |
| Inorganic filler | Silica | D70 | 100 | 100 | 100 | 100 | 100 | 100 | 100 | 100 |
| Catalyst | 2-Ethyl-4-methylimidazole | 2E4MI | 0.4 | 0.4 | 0.4 | 0.4 | 0.4 | 0.4 | 0.4 | 0.4 |
| Solvent | Methyl ethyl ketone | MEK | aa | aa | aa | aa | aa | aa | aa | aa |
| | Dimethylacetamide | DMAc | aa | aa | aa | aa | aa | aa | aa | aa |

(aa represents "appropriate amount")

Properties Test

The properties of the laminates were tested according to the following test methods. The test results are shown in Table 3 and Table 4:

(1) Peel Strength (P/S)

Each aforesaid copper-clad laminate (five-ply) was used as the specimen and measured by a universal tensile tester by reference to IPC-TM-650 2.4.8.

(2) Double-Sided Board Thermal Resistance

A double-sided board was prepared as below: two outmost layers of seven prepregs (2116 E-glass fiber fabric) were respectively covered with a half-ounce HTE copper foil. The seven prepregs were sandwiched between the copper foils and subject to a lamination and curing process under vacuum at high temperature (195° C.) and high pressure (400 psi) for 4 hours to form a copper-clad laminate, which was then subject to PCB processes (drilling, desmearing and plating) to form a double-sided board (the distance between central points of holes, i.e. pitch, is 0.7 mm). Whether the double-sided board was delaminated was visually observed after the six reflow cycles at 260° C.

(3) Modulus Decrease Rate

A DMA instrument was used to measure the storage modulus of a copper-free laminate (five-ply) by reference to the process of IPC-TM-650 2.4.24.4 (Glass Transition and Modulus of Materials Used in High Density Interconnection (HDI) and Micro vias-DMA Method), wherein the storage modulus at 50° C. and 250° C. was measured separately, with a unit of Gpa.

Modulus decrease rate may be calculated by the following equation: modulus decrease rate=|((modulus at 50° C.−modulus at 250° C.)/modulus at 50° C.)|*100%.

(4) Thermal Resistance (T288)

In the thermal resistance test, each copper-clad laminate (five-ply) 6.5 mm×6.5 mm in size was used as a specimen and measured under a constant temperature of 288° C. by a thermal mechanical analyzer (TMA) by reference to IPC-TM-650 2.4.24.1, and the time-to-delamination after heating was measured. In general, longer time indicates better thermal resistance of the copper-clad laminate made from the resin composition.

(5) Glass Transition Temperature (Tg)

The aforesaid copper-free laminates (five-ply) were tested for the glass transition temperature by employing a thermomechanical analyzer (TMA) by reference to IPC-TM-650 2.4.24.5.

(6) Dissipation Factor (Df)

In the dissipation factor measurement, the aforesaid copper-free laminates (two-ply) were used as the specimens. A microwave dielectrometer (commercially available from AET Inc.) was used by reference to the procedure described in JIS C2565 to make the measurement under room temperature at 2 GHz frequency. Generally, lower dissipation factor represents a better dielectric property of the specimen. A difference of less than 0.0005 in Df indicates no significant difference in dissipation factor of laminates, and a difference of greater than 0.0005 in Df indicates significant difference in dissipation factor of different laminates.

(7) Peel Strength of the Copper with a Carrier

A core was made as below. Four first prepregs (7628 E-glass fiber fabric, resin content=42%) were superimposed and then sandwiched between two copper foils and subject to a lamination and curing process under vacuum at high temperature (195° C.) and high pressure (360 psi) for 2 hours to form a copper-clad core. The copper-clad core was subject to a brown oxide treatment to obtain a brown oxide core, which was then covered on two sides with prepregs respectively, such as two prepregs prepared from the same resin composition of each Example or each Comparative Example. Each prepreg has a resin content of about 55%. The two prepregs were then covered on two sides with ultrathin copper foils (MTHD18-V2) having a thickness of 3 μm respectively, and the assembly of an ultrathin copper foil (ultrathin copper surface bonded to prepregs (PP) and carrier layer was away from prepregs), a prepreg, a brown oxide core, a prepreg, a ultrathin copper foil was laminated under vacuum at 195° C. for 2 hours to form a copper-clad laminate with ultrathin copper foils. The carrier copper on the ultrathin copper surface of the outer layers of the laminate was peeled off, followed by a plating process without cleaning to obtain a four-ply circuit board with the copper layers having a thickness of 35 μm.

Test of Peel Strength of the Copper with a Carrier

Each four-ply circuit board was subject to the measurement of the peel strength between a copper-free laminate and an ultrathin copper foil by reference to IPC-TM-650 2.4.8 (Peel Strength of Metallic Clad Laminates), with a unit of lb/inch.

(8) Flame Retardancy

In the flame retardancy test, each copper-free laminate (eight-ply) 125 mm×13 mm in size was used as the specimen and measured according to UL94, and the results of flame retardancy are designated as V-0, V-1 and V-2 ratings, wherein the flame retardancy of V-0 is superior to that of V-1, the flame retardancy of V-1 is superior to that of V-2, and burn-out represents the worst flame retardancy.

TABLE 3

Properties of laminates made from the resin compositions of E1-E19

| Property | Test item | Unit | Examples | | | | | | | | | |
|---|---|---|---|---|---|---|---|---|---|---|---|---|
| | | | 1 | 2 | 3 | 4 | 5 | 6 | 7 | 8 | 9 | 10 |
| P/S | HOz (HTE) | lb/inch | 7.4 | 7.3 | 7.6 | 7.5 | 7.5 | 6.6 | 7.9 | 7.8 | 7.7 | 7.7 |
| Double-sided board thermal resistance | 0.7 pitch | cycle | >6 | >6 | >6 | >6 | >6 | >6 | >6 | >6 | >6 | >6 |
| Modulus decrease rate | / | % | 28 | 29 | 27 | 28 | 35 | 28 | 30 | 28 | 28 | 29 |
| T288 | / | mm | >30 | >30 | >30 | >30 | >30 | >30 | >30 | >30 | >30 | >30 |
| Tg (TMA) | / | ° C. | 265 | 261 | 265 | 262 | 262 | 260 | 259 | 264 | 266 | 263 |
| Dissipation factor (Df) | 2 GHz | / | 0.0055 | 0.0057 | 0.0054 | 0.0055 | 0.0063 | 0.0056 | 0.0056 | 0.0057 | 0.0058 | 0.0057 |
| Peel strength of the copper with a carrier | / | lb/inch | 4.5 | 4.2 | 4.3 | 4.5 | 4.8 | 4.3 | 4.6 | 4.3 | 4.2 | 4.2 |
| Flame retardancy | / | / | V-0 | V-0 | V-0 | V-0 | V-0 | V-0 | V-0 | V-0 | V-0 | V-0 |

| Property | Test item | Unit | Examples | | | | | | | | |
|---|---|---|---|---|---|---|---|---|---|---|---|
| | | | 11 | 12 | 13 | 14 | 15 | 16 | 17 | 18 | 19 |
| P/S | HOz (HTE) | lb/inch | 7.5 | 7.7 | 7.5 | 7.4 | 7.6 | 7.7 | 7.7 | 7.0 | 7.3 |
| Double-sided board thermal resistance | 0.7 pitch | cycle | >6 | >6 | >6 | >6 | >6 | >6 | >6 | >6 | >6 |
| Modulus decrease rate | / | % | 27 | 35 | 32 | 30 | 35 | 28 | 34 | 31 | 29 |
| T288 | / | mm | >30 | >30 | >30 | >30 | >30 | >30 | >30 | >30 | >30 |
| Tg (TMA) | / | ° C. | 266 | 259 | 262 | 261 | 258 | 260 | 258 | 258 | 259 |
| Dissipation factor (Df) | 2 GHz | / | 0.0055 | 0.0059 | 0.005 | 0.005 | 0.0051 | 0.0055 | 0.0051 | 0.006 | 0.005 |
| Peel strength of the copper with a carrier | / | lb/inch | 4.3 | 4.4 | 6 | 6 | 6.3 | 4.3 | 4.3 | 4.0 | 4.5 |
| Flame retardancy | / | / | V-0 | V-0 | V-0 | V-0 | V-0 | V-0 | V-0 | V-0 | V-0 |

TABLE 4

Properties of laminates made from the resin compositions of C1-C17

| Property | Test item | Unit | Comparative Examples |  |  |  |  |  |  |  |  |
|---|---|---|---|---|---|---|---|---|---|---|---|
|  |  |  | 1 | 2 | 3 | 4 | 5 | 6 | 7 | 8 | 9 |
| P/S | HOz (HTE) | lb/inch | 7.0 | 6.8 | 5.3 | 7.8 | 5.5 | 5.7 | 5.6 | 5.0 | 5.0 |
| Double-sided board thermal resistance | 0.7 pitch | cycle | >6 | 3 | >6 | >6 | >6 | >6 | >6 | >6 | 3 |
| Modulus decrease rate | / | % | 45 | 23 | 28 | 32 | 28 | 29 | 28 | 28 | 39 |
| T288 | / | mm | 20 | 15 | >30 | 15 | >30 | >30 | >30 | >30 | >30 |
| Tg (TMA) | / | °C. | 256 | 266 | 263 | 258 | 262 | 263 | 263 | 263 | 260 |
| Dissipation factor (Df) | 2GHz | / | 0.0057 | 0.0054 | 0.0057 | 0.006 | 0.0054 | 0.0054 | 0.0055 | 0.0055 | 0.0068 |
| Peel strength of the copper with a carrier | / | lb/inch | 4.3 | 4.5 | 4.4 | 4.4 | 4.3 | 4.2 | 4.3 | 4.2 | 4.0 |
| Flame retardancy | / | / | V-0 | V-0 | V-0 | V-0 | V-0 | V-0 | V-0 | V-0 | V-0 |

| Property | Test item | Unit | Comparative Examples |  |  |  |  |  |  |  |
|---|---|---|---|---|---|---|---|---|---|---|
|  |  |  | 10 | 11 | 12 | 13 | 14 | 15 | 16 | 17 |
| P/S | HOz (HTE) | lb/inch | 5.5 | 7.3 | 6.3 | 7.6 | 7.7 | 7.6 | 7.7 | 6.5 |
| Double-sided board thermal resistance | 0.7 pitch | cycle | 2 | >6 | >6 | >6 | >6 | >6 | >6 | >6 |
| Modulus decrease rate | / | % | 70 | 39 | 32 | 28 | 27 | 29 | 25 | 42 |
| T288 | / | mm | 24 | >30 | >30 | >30 | >30 | >30 | >30 | >30 |
| Tg (TMA) | / | °C. | 170 | 259 | 232 | 240 | 235 | 236 | 235 | 255 |
| Dissipation factor (Df) | 2GHz | / | 0.010 | 0.005 | 0.0069 | 0.0066 | 0.0068 | 0.0069 | 0.006 | 0.0066 |
| Peel strength of the copper with a carrier | / | lb/inch | 3.6 | 4.3 | 4.5 | 4.4 | 4.4 | 4.5 | 4.3 | 4.2 |
| Flame retardancy | / | / | V-0 | V-0 | V-0 | V-0 | V-0 | V-0 | V-1 | V-0 |

From E1-E3 and C1-C2, it is observed that when the amount of maleimide in the resin composition is less than 40 parts by weight, the modulus decrease rate of the laminates is increased, and the thermal resistance is decreased; when the amount is greater than 80 parts by weight, both the double-sided board thermal resistance and the thermal resistance T288 fail to satisfy the requirements of the laminates. From E4, E6-E7 and C3-C4, it is observed that when the amount of oxydianiline type benzoxazine resin in the resin composition is less than 10 parts by weight, the peel strength of a laminate is remarkably decreased; when the amount is greater than 30 parts by weight, the thermal resistance of the laminates is decreased, which fails to satisfy the requirements of the laminates. As shown in E4 and C5-C8, compared with other benzoxazine resins, using the oxydianiline type benzoxazine resin in the resin composition of the present disclosure remarkably increases the peel strength of a laminate. From E4 and E13-E15, it is observed that the addition of cyanate ester to the resin composition does not significantly change the peel strength of a laminate, but greatly improves the peel strength of the copper with a carrier. From C11, it is observed that when the amount of cyanate ester is greater than 8 parts by weight, the modulus decrease rate of the laminates tends to increase, and the peel strength of the copper with a carrier is greatly decreased. From E4, E17-E18 and C16-C17, it is observed that when the amount of the flame retardant in the resin composition is less than 10 parts by weight, the glass transition temperature and the flame retardancy of the laminates are decreased, and when the amount is greater than 40 parts by weight, the peel strength of a laminate to the copper foil is decreased, and the modulus decrease rate is remarkably increased. From E4, E16, E19 and C12-C15, it is observed that when other flame retardants were used, the glass transition temperature of the laminates is remarkably decreased, and the dissipation factor is remarkably increased.

As described above, it can be understood from Tables 1-4 that the laminates made from the resin composition of the present disclosure have an excellent thermal resistance and flame retardancy, a low dissipation factor, a high peel strength and a high glass transition temperature. Various articles made from the resin composition can sufficiently satisfy the demands for high frequency and high thermal resistance circuit boards.

The foregoing description presents the specific embodiments of the present disclosure for the purpose of illustrating the inventive concept of the present disclosure more clearly, but it is not intended to limit the scope of the claims of the present disclosure. According to the inventive concept of the present disclosure, those of ordinary skill in the art will be able to easily adapt and modify the above-described embodiments, the variations and modifications of which are all within the scope of the present disclosure as defined by the claims of the present disclosure.

What is claimed is:

1. A resin composition, comprising:
   (A) 40 to 80 parts by weight of maleimide monomer and/or resin;
   (B) 10 to 30 parts by weight of oxydianiline type benzoxazine monomer and/or resin; and
   (C) 10 to 40 parts by weight of flame retardant;
   wherein the flame retardant comprises one or more of a flame retardant having a thermal decomposition temperature of greater than 380° C., a metal phosphinate flame retardant and bis(pentabromophenyl) ethane; and
   wherein the metal of the metal phosphinate flame retardant is selected from Group 13 elements.

2. The resin composition of claim 1, further comprising 1 to 8 parts by weight of cyanate ester monomer and/or resin.

3. The resin composition of claim 1, wherein the oxydianiline type benzoxazine monomer and/or resin comprises one or more of a monomer represented by Formula (I), an oligomer obtained from the monomer represented by Formula (I), a polymer obtained from the monomer represented by Formula (I), a derivative of the monomer represented by Formula (I), an oligomer of the derivative and a polymer of the derivative:

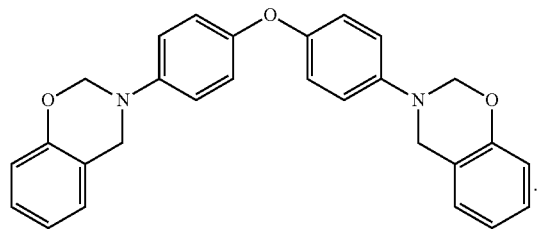

Formula (I)

4. The resin composition of claim 1, wherein the flame retardant having a thermal decomposition temperature of greater than 380° C. has two DPPO structures.

5. The resin composition of claim 1, wherein the flame retardant having a thermal decomposition temperature of greater than 380° C. has a structure represented by Formula (II) or Formula (III):

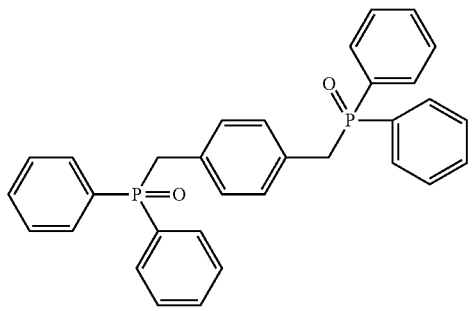

Formula (II)

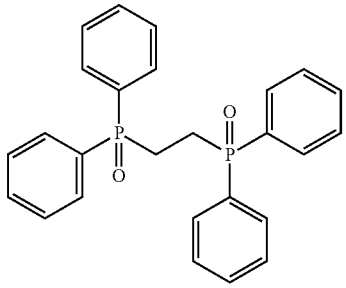

Formula (III)

6. The resin composition of claim 5, wherein the flame retardant having a thermal decomposition temperature of greater than 380° C. has a structure represented by Formula (II).

7. The resin composition of claim 1, wherein the metal phosphinate flame retardant is an aluminum phosphinate.

8. The resin composition of claim 1, wherein the metal phosphinate flame retardant is represented by Formula (IV):

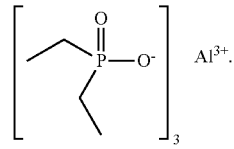

Formula (IV)

9. The resin composition of claim 1, further comprising epoxy resin.

10. An article made from the resin composition of claim 1, comprising a prepreg, a resin film, a copper-clad laminate or a printed circuit board.

* * * * *